United States Patent
Wendl et al.

(10) Patent No.: US 7,527,114 B2
(45) Date of Patent: May 5, 2009

(54) ELECTRICALLY-POWERED AXLE WITH WHEEL HUB DRIVE

(75) Inventors: Harald Wendl, Vilshofen (DE); Max Bachmann, Bad Waldsee (DE); Stefan Häußler, Tiefenbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 549 days.

(21) Appl. No.: 10/562,026

(22) PCT Filed: Jun. 11, 2004

(86) PCT No.: PCT/EP2004/006305

§ 371 (c)(1),
(2), (4) Date: Jan. 18, 2006

(87) PCT Pub. No.: WO2005/005189

PCT Pub. Date: Jan. 20, 2005

(65) Prior Publication Data

US 2006/0158024 A1    Jul. 20, 2006

(30) Foreign Application Priority Data

Jul. 8, 2003   (DE) ................................ 103 30 690

(51) Int. Cl.
*B60K 11/02*   (2006.01)

(52) U.S. Cl. ................ 180/65.5; 903/952; 301/6.5; 310/52

(58) Field of Classification Search ............... 180/65.5; 903/906, 952; 301/6.5; 310/52, 54, 57, 75 R
See application file for complete search history.

(56) References Cited

U.S. PATENT DOCUMENTS

| | | | | |
|---|---|---|---|---|
| 4,408,809 A | * | 10/1983 | Walter et al. | ................ 384/486 |
| 5,127,485 A | * | 7/1992 | Wakuta et al. | ............. 180/65.5 |
| 5,156,579 A | * | 10/1992 | Wakuta et al. | ............. 475/161 |
| 5,632,157 A | * | 5/1997 | Sekino et al. | ................. 62/244 |
| 6,139,464 A | | 10/2000 | Roske | |
| 6,651,762 B1 | | 11/2003 | Hokanson et al. | |
| 2006/0272871 A1 | * | 12/2006 | Murata | ...................... 180/65.5 |

FOREIGN PATENT DOCUMENTS

| | | |
|---|---|---|
| DE | 197 09 577 A1 | 10/1998 |
| DE | 199 05 539 A1 | 8/2000 |
| DE | 202 06 821 U1 | 10/2003 |
| EP | 0 484 548 A1 | 5/1992 |
| EP | 0 879 724 A2 | 11/1998 |
| EP | 199 05 539 A1 | 8/2000 |

* cited by examiner

*Primary Examiner*—Christopher P Ellis
*Assistant Examiner*—John D. Walters
(74) *Attorney, Agent, or Firm*—Davis & Bujold, P.L.L.C.

(57) ABSTRACT

An axle with wheel hub drive including an electric motor (3) cooled with cooling fluid is proposed in which an external cooling is incorporated in the wheel heads (2) of the axle (1).

13 Claims, 2 Drawing Sheets

ELECTRICALLY-POWERED AXLE WITH WHEEL HUB DRIVE

This application is a national stage completion of PCT/EP2004/006305 filed Jun. 11, 2004 which claims priority from German Application Serial No. 103 30 690.0 filed Jul. 8, 2003.

FIELD OF THE INVENTION

The present invention concerns an electric axle with wheel hub drive.

BACKGROUND OF THE INVENTION

Electric axles with wheel hub drive are known from the state of the art. Wheel hub drives are usually used in industrial motor vehicles and omnibuses as they have the advantage in comparison with flat-type wheel or beveled wheel drives that the transmission, drive motor, brake and wheel are arranged in the smallest space. Furthermore, chassis without continuous axle shafts are made possible through the use of wheel hub drives.

Usually asynchronous machines which include a stator and a rotor are used as wheel hub drives according to the state of the art. Here the rotor is constructed as a cage rotor and as a rule consists of electrically conductive aluminum which is shaped into the rotor in the form of a die casting. Asynchronous machines are highly used motors which require corresponding cooling due to the high heat development.

In German Patent DE 199 05 539 A1 by the Applicant, an asynchronous machine of the type described at the beginning is described into which a heat exchanger of the coolant used in the asynchronous machine is incorporated for the purpose of optimized cooling.

A great amount of heat is also emitted by the bearings and gearings arranged in the closest space in addition to the electric motor as a source of heat. In addition, a special rim with a larger bolt hole is used, the dissipation of heat into the environment is additionally reduced since, in this case, less space is available for the ventilation holes.

Moreover, the brakes or the brake disks prove to be a significant additional source of heat. Accordingly, situations often arise in which the heat developed cannot be completely given off into the surroundings due to the compact construction, so that problems arise which can negatively influence the function and lifetime of a wheel hub drive.

The present invention is based on the objective of representing an axle with wheel hub drive through which the disadvantages of the state of the art mentioned are avoided. In particular, an optimal cooling of the wheel hub drive should be guaranteed.

SUMMARY OF THE INVENTION

It is proposed to configure the axle such that an external cooling is incorporated into the wheel head. Using the cooling fluid of the electric motor of the wheel hub drive to cool the wheel head is proposed in the frame of a preferred embodiment of the present invention.

Liquid cooling can most effectively take place in the vicinity of the wheel bearing since this position has a large surface. In this way, a good transfer of heat from metal to cooling fluid is made possible.

The wheel head is very effectively cooled at a suitable place through the design of the invention. Furthermore, the solution proposed here is economical since an already available cooling fluid circuit is used and extended as needed.

BRIEF DESCRIPTION OF THE DRAWINGS

The invention will now be described, by way of example, with reference to the accompanying drawings in which.

DETAILED DESCRIPTION OF THE INVENTION

Figure 1:
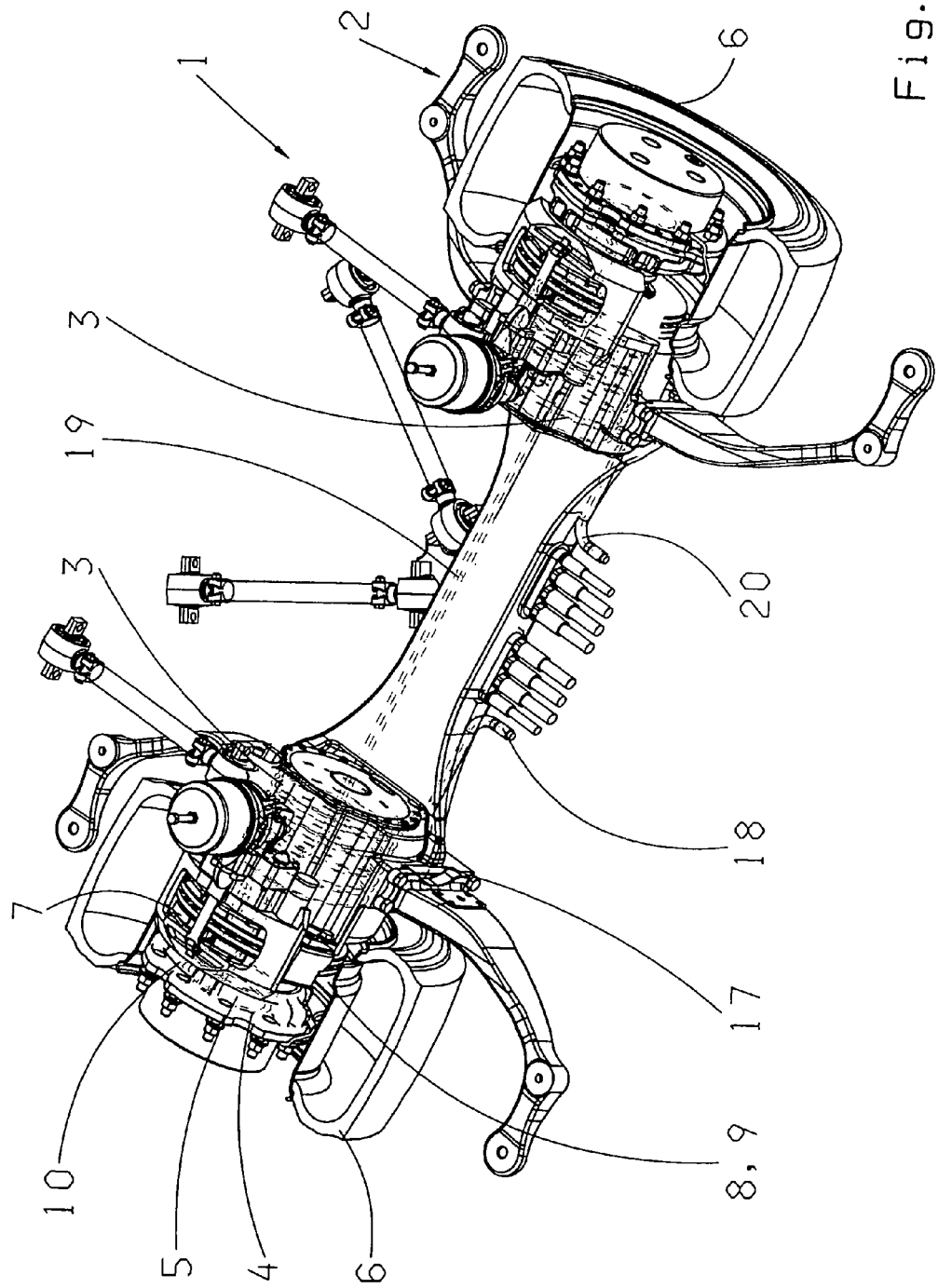
FIG. 1 shows a three-dimensional view of a preferred embodiment of an axle with wheel hub drive of the invention.

An axle 1 of the invention is depicted in FIG. 1, which includes two wheel heads 2 which respectively contain an electric motor 3, brakes 4 and a wheel bearing 5 for wheels 6 cooled with cooling fluid.

Figure 2:
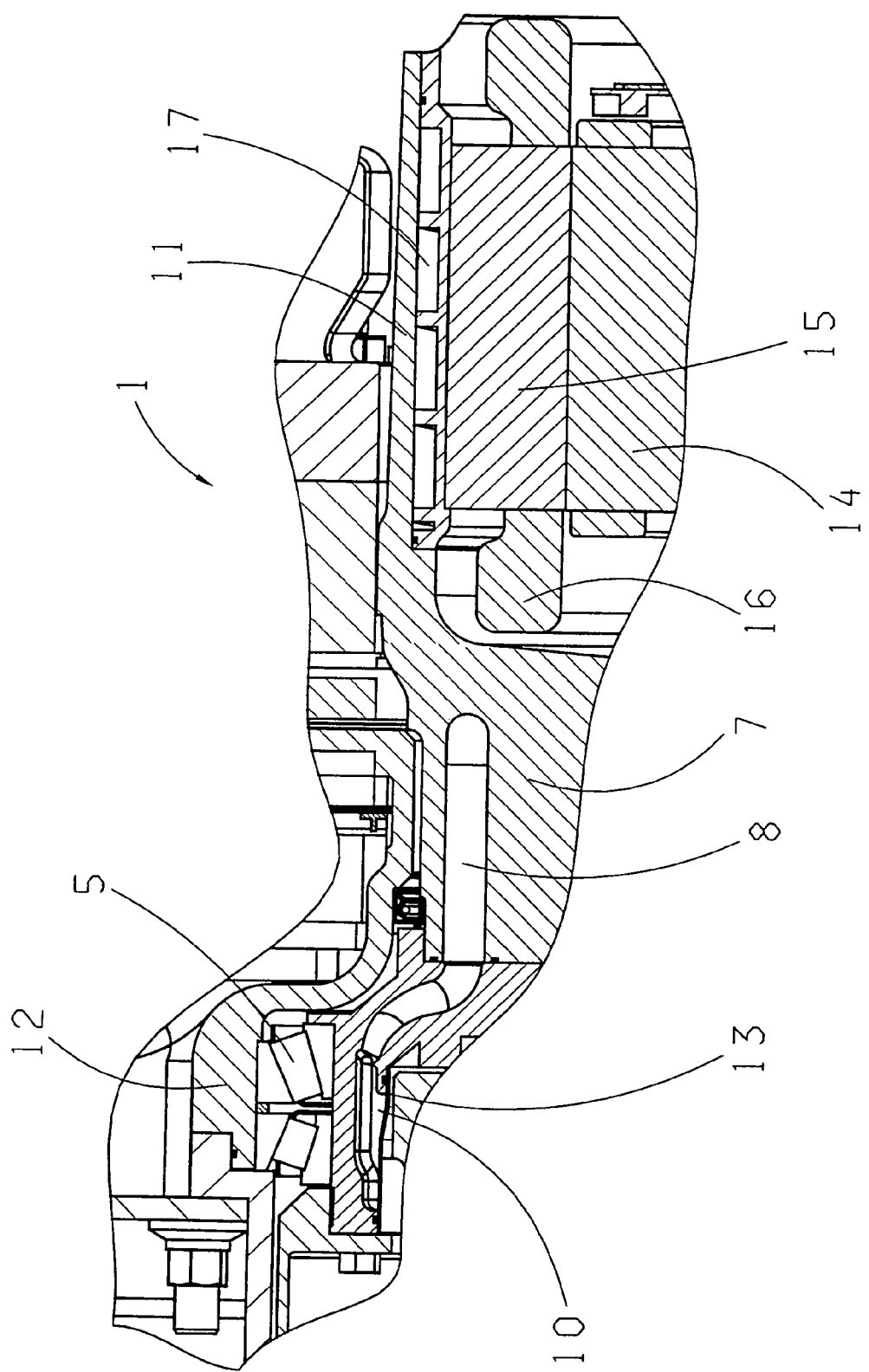
FIG. 2 shows a sectional view of an embodiment of an axle with wheel hub drive in accordance with the invention.

In accordance with FIGS. 1 and 2, two channels 8, 9 are provided in a neck 7 of a motor housing 11 into which the cooling fluid in the wheel head 2 is fed and carried away. In a hub mounting 12 of the respective wheel head 2, the cooling fluid is fed directly into an annular cooling fluid channel 10 provided in accordance with the invention inside the wheel bearing 5, whereby the cooling fluid flows annularly inside the wheel bearing 5 until recirculation. As can be gathered from FIG. 2, a metal sheet 13 is provided for separation of oil and cooling fluid. Furthermore a rotor 14, a stator 15, a winding overhang 16 and a spiral-shaped jacket 17 for cooling the electric motor 3 are illustrated in FIG. 2.

In an especially advantageous embodiment, the cooling water circulation is constructed such that the cooling fluid first flows into the wheel head 2 through a feed pipe 18 or cooling water inflow in the wheel head 2 and from there flows through one connecting channel 19 into the other, so that a cooling water inflow and cooling water recirculation line are required on the part of the motor vehicle. The cooling water recirculation line is provided with the reference number 20 in FIG. 1.

REFERENCE NUMERALS 1 axle
2 wheel head
3 electric motor
4 brake
5 wheel bearing
6 wheel
7 neck of the motor housing
8 channel
9 channel
10 annular cooling water channel
11 motor housing
12 hub mounting
13 metal sheet for separating oil and cooling fluid
14 rotor
15 stator
16 winding overhand
17 spiral-shaped jacket
18 feed pipe
19 connecting channel
20 cooling water recirculation channel

The invention claimed is:

1. An axle (1) with wheel hub drive, comprising:
   a motor housing (11) including an electric motor (3) and having a neck (7) containing at least one cooling fluid channel (8, 9) for flow of a cooling fluid,
   a wheel head (2) including:
      a hub mounting (12) rotatably mounted to the neck (7) of the motor housing (11) and including a wheel bearing (5) for a wheel (6), and
      an annular cooling fluid channel (10) arranged circumferentially with the wheel bearing (5) and connected with the at least one cooling fluid channel (8, 9) in the motor housing (11), thereby providing a flow of cooling fluid to cool at least the wheel bearing (5).

2. The axle with wheel hub drive according to claim 1, wherein
   the flow of cooling fluid to the annular cooling fluid channel (10) to cool at least the wheel bearing (5) is comprised of a cooling fluid of the electric motor (3) of the wheel hub drive.

3. The axle with wheel hub drive according to claim 1, wherein the at least one cooling fluid channel (8, 9) comprises first and second cooling fluid channels (8, 9) respectively for providing the cooling fluid to the wheel head (2) and recirculating the cooling fluid from the wheel head (2).

4. The axle with wheel hub drive according to claim 1, wherein the cooling fluid channel (10) is provided in a hub mounting (12) of respective wheel head through which the cooling fluid of the electric motor (3) is introduced directly in the region of the wheel bearing (5), the cooling fluid flows annularly on the hub mounting (12) until recirculation.

5. The axle with wheel hub drive according to claim 1, wherein the axle (1) includes a supply pipe (18) for supplying the cooling fluid into at least two wheel heads (2), a connection channel (19) between the at least two wheel heads (2) and a cooling fluid recirculation line (20) proceeding from a first wheel head so that the cooling fluid flows through the supply line (18) to the first wheel head and from there through the connection channel (19) into a second wheel head, so that a cooling water inflow and a cooling water recirculation line (18, 19) are needed on a part of the motor vehicle.

6. The axle with wheel hub drive according to claim 1, wherein a metal sheet (13) is arranged in a wheel head (2) for separating the cooling fluid in the cooling fluid channel (10) from oil.

7. An axle with a wheel hub drive including an electric motor (3) which is cooled by a cooling fluid, and the axle further including a wheel bearing (5) for facilitating rotation of a wheel (6),
   wherein a cooling fluid channel (10) is arranged adjacent a region of the wheel bearing (5) through which the cooling fluid flows to facilitate cooling the wheel bearing (5).

8. The axle with wheel hub drive according to claim 1, wherein two separate wheel heads (2) are cooled by the cooling fluid supplied to the electric motor (3) of the wheel hub drive.

9. The axle with wheel hub drive according to claim 1, wherein first and second channels (8, 9) are provided in a neck (7) of a motor housing (11) by which the cooling fluid is fed into and removed from a wheel head (2).

10. The axle with wheel hub drive according to claim 1, wherein the cooling fluid channel (10) is provided in a hub mounting (12) of respective wheel head through which the cooling fluid of the electric motor (3) is introduced directly in the region of the wheel bearing (5), and the cooling fluid flows annularly along the hub mounting (12) for recirculation.

11. The axle with wheel hub drive according to claim 1, wherein the axle (1) includes a supply pipe (18) for supplying the cooling fluid into at least first and second wheel heads (2), a connection channel (19) which connects the first wheel head (2) with the second wheel head (2), and a cooling recirculation line (20) proceeding from a second wheel head so that the cooling fluid flows through the supply line (18) to the first wheel head through the connection channel (19) to the second wheel head and to the cooling recirculation line (20).

12. The axle with wheel hub according to claim 1, wherein a metal sheet (13) is arranged in a wheel head (2) for separating the cooling fluid in the cooling fluid channel (10) from lubrication oil for the wheel.

13. An axle with a wheel hub drive including an electric motor (3) which is cooled by a cooling fluid, and the axle further including a wheel bearing (5) for facilitating rotation of a wheel (6),
   wherein a cooling fluid channel (10) is arranged adjacent a region of the wheel bearing (5) and couples the electric motor (3) with the wheel bearing (5) so that the cooling fluid flows, at least during operation of The electric motor (3), to the wheel bearing (5) to facilitate cooling the wheel bearing (5).

* * * * *